POWER LINE CARRIER FREQUENCY TELEPHONE SYSTEM

Filed Oct. 11, 1946 2 Sheets-Sheet 1

INVENTORS J. M. BARSTOW
A. G. LANG
BY
R. O. Covell
ATTORNEY

POWER LINE CARRIER FREQUENCY TELEPHONE SYSTEM

Filed Oct. 11, 1946 2 Sheets-Sheet 2

INVENTORS J. M. BARSTOW
A. G. LANG
BY
R. O. Covell
ATTORNEY

Patented June 13, 1950 2,511,616

UNITED STATES PATENT OFFICE 2,511,616

POWER LINE CARRIER FREQUENCY TELEPHONE SYSTEM

John M. Barstow, Mountain Lakes, N. J., and Albert G. Lang, Whitestone, N. Y., assignors to Bell Telephone Laboratories, Incorporated, New York, N. Y., a corporation of New York Application October 11, 1946, Serial No. 702,734

7 Claims. (Cl. 179—2.5)

Figure 1:
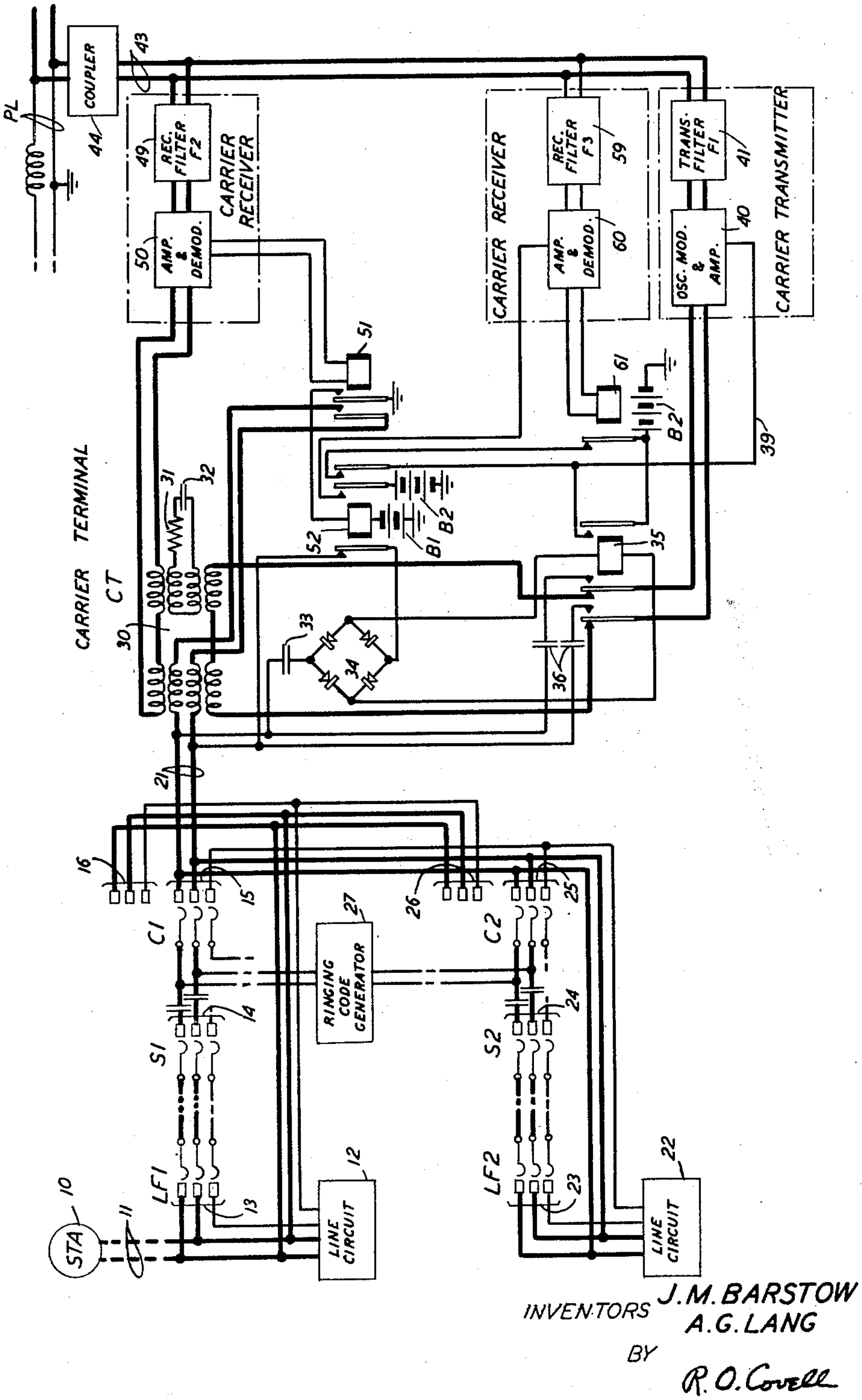

This invention relates to communication systems and particularly to telephone systems including subscriber stations arranged for carrier current operation over a power transmission line.

Objects of the invention are the provision of carrier telephone service over a power transmission line, the provision of means for automatically guarding the telephone line to the telephone central office associated with the power line on calls between telephone stations connected to the power line, the elimination of manual control means at these stations heretofore provided for use only on such calls, and in general the simplification and improvement of power line carrier telephone systems.

This invention is a telephone system comprising subscriber stations arranged for carrier current operation over a power transmission line in which carrier current of one frequency is used for transmitting over the power line voice and signal currents to any one of these stations and carrier current of another frequency is used for transmitting over the power line voice and signal currents from any one of these stations, except that on reverting calls the carrier frequencies for transmitting voice and signal currents to and from the calling station are automatically interchanged. A feature of the invention is the provision of means at each carrier station for automatically transmitting over the power line on a reverting call a reverting call signal consisting of carrier current of a third frequency.

An understanding of the invention will be facilitated by considering a system in which the invention and its features are embodied, such a system being represented schematically in the drawing. The invention is, however, not limited in its application to the system shown but is generally applicable to telephone systems.

The drawing, which consists of two figures, represents an automatic telephone exchange serving subscriber stations some of which are arranged for carrier operation over a power transmission line.

Fig. 1 shows an automatic telephone exchange comprising a subscriber station 10, subscriber lines 11 and 21 and line circuits 12 and 22, line-finder switches LF1 and LF2, selector switches S1 and S2, connector switches C1 and C2, a carrier terminal station or equipment unit CT individual to the line 21, and a power transmission line PL to which the carrier terminal equipment CT is coupled by coupling means 44.

Figure 2:
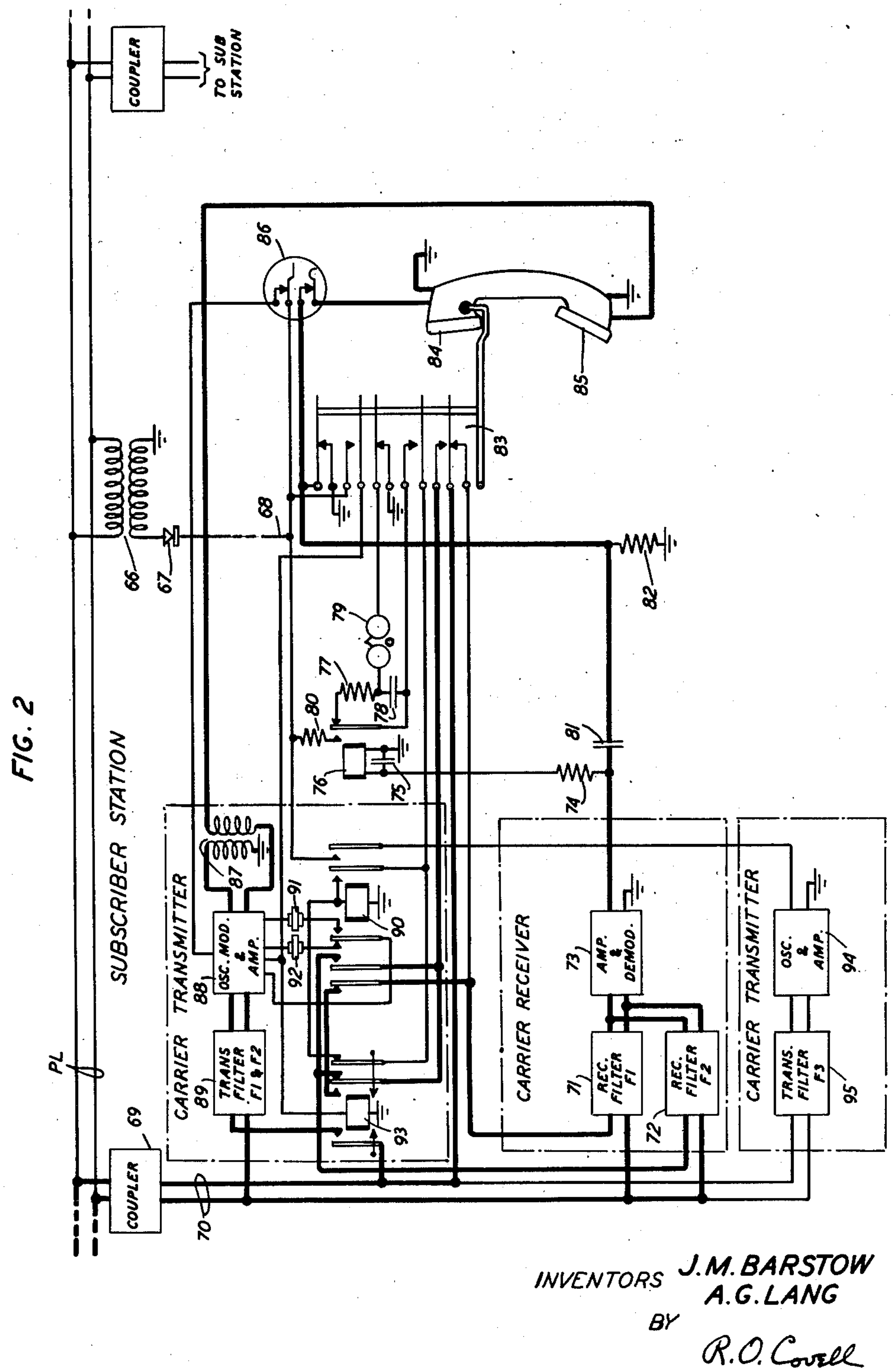

Fig. 2 shows one of a plurality of subscriber stations connected to, and arranged for carrier current operation over, the power line PL.

The subscriber station 10 is of the usual type provided for use on lines terminating in an automatic central office and includes a dial or impulse sender (not shown) for use in selectively controlling the switches through which desired connections are established. The line-finder, selector and connector switches are of the two motion step-by-step type, each of the line-finder and selector switches being represented in the drawings by a set of brushes and a single set of terminals, and each of the connector switches being represented by a set of brushes and two sets of terminals. The relays and other apparatus associated with the line-finder, selector and connector switches are represented by broken lines. Reference may be had to "Automatic Telephony" by Smith and Campbell, 2nd edition, pages 53 to 65 for a detailed description of the structure of two-motion step-by-step switches and their operation when used as selectors and connectors. Reference may be had to the patent to R. L. Stokely 1,799,654, granted April 7, 1931, for disclosure of a line circuit and a line finder of the step-by-step type. The ringing code generator 27 comprises a source of ringing current and means for interrupting the ringing supply conductors as required to produce a plurality of different ringing codes for signaling subscriber stations. Reference may be had to the patent to Duguid No. 2,225,907, granted December 24, 1940, for disclosure of such a ringing code generator and to the patent to Koechling No. 2,289,503, granted July 14, 1942, for a detailed disclosure of a connector switch arranged to ten party code ringing.

The carrier terminal equipment CT, power line PL and the carrier telephone subscriber stations of Fig. 2 constitute a power line carrier telephone system similar generally to the system disclosed in the copending application of R. C. Edson and J. W. Emling, Serial No. 653,254, filed March 9, 1946, now Patent No. 2,481,915, granted September 13, 1949, to which application reference may be had for discussion of the carrier frequencies suitable for use in such a system and for disclosure of the coupling means between the power line and the carrier receivers and transmitters and details of the carrier terminal equipment CT and carrier telephone stations. The power line PL is one phase of a power transmission line which serves a plurality of power and light customers, some of which are equipped for carrier telephone service as shown in Fig. 2.

The carrier terminal station or equipment unit CT comprises a hybrid coil or group of transformer windings 30 arranged to transmit signal and voice currents to and from line 21. The resistor 31 and condenser 32 constitute a network connected to the middle right pair of windings to balance the line 21. The upper pair of windings receive voice frequency currents from the carrier receiver comprising amplifier-demodulator 50 and the lowest pair of windings transmit voice frequency currents from line 21 to the input circuit of the carrier transmitter comprising oscillator-modulator-amplifier 40. The power line PL is connected through coupling means 44 and conductors 43 to the carrier receiver comprising receiving band filter 49 and the associated amplifier-demodulator 50, to the carrier receiver comprising receiving band filter 59 and associated amplifier-demodulator 60, and to the carrier transmitter comprising transmitting band filter 41 and oscillator-modulator-amplifier 40. The amplifier-demodulators 50 and 60 and the oscillator-modulator-amplifier 40 may be of any known suitable type. The oscillator-modulator 40 is tuned to transmit through filter 41 carrier current of a particular frequency F1 as modulated by either signaling or voice currents incoming over line 21. The amplifier-demodulator 50 receives through filter 49 from the power line PL, carrier current of another particular frequency F2, modulated by voice and signal currents from any one of the carrier telephone stations connected to the power line PL. The amplifier-demodulator 60 receives through filter 59 from power line PL, carrier current of frequency F3 which is transmitted from any one of the carrier telephone stations while a reverting call is being made therefrom. The transmitting and receiving filters 41 and 49 transmit the voice frequency sidebands in addition to the carrier frequency. The carrier terminal equipment CT further comprises relay 35 controlled by ringing current incoming over line 21 to connect battery B2 to oscillator-modulator-amplifier apparatus 40 and thereby effect the transmission over power line PL of impulses of carrier current corresponding to the ringing code received by relay 35 from line 21. The carrier terminal equipment CT further comprises relays 51 and 52 controlled by amplifier-demodulator 50 responsive to signals transmitted over the power line by carrier current of frequency F2 from any of the carrier stations, and also comprises a relay 61 controlled by amplifier-demodulator 60 responsive to signals transmitted over the power line by carrier current of frequency F3. The functions of each of these relays is hereinafter described in detail.

Each of the carrier telephone subscriber stations is similar to the one shown in Fig. 2 and is connected through individual coupling means 69 to the power line PL. Each station comprises a carrier receiver, a carrier transmitter, a telephone receiver 84 and transmitter 85 combined in a handset which normally rests on the receiver hook 83, a dial 86 for controlling automatic switches in the telephone central office to establish desired connections, a relay 76 and a ringer 79. The carrier receiver comprises a receiving band filter 71 tuned to the carrier frequency F1, a receiving band filter 72 tuned to the carrier frequency F2, and amplifier-demodulator apparatus 73. The carrier transmitter comprises oscillator-modulator-amplifier apparatus 88 and a transmitting band filter 89 for transmitting voice modulated carrier current of either frequency F1 or frequency F2 depending upon whether the call is an incoming or an outgoing call, a frequency control relay 90, oscillator crystals 91 and 92, and a transmitter control relay 93 for connecting the output conductors of filter 89 to the power line. The receiving and transmitting filters transmit the voice frequency sidebands in addition to the carrier frequency. The amplifier demodulators and oscillator-modulator-amplifier may be of any known suitable type. Each station further comprises an oscillator-amplifier 94 and an associated transmitting band filter 95 tuned to transmit carrier current of frequency F3 over the power line as a reverting call signal on reverting calls. The power supply for the oscillator, modulator, demodulator and amplifier apparatus includes a rectifier 67 and a transformer 66, connected to the power line either directly or through an intermediate transformer. Other transformer windings may provide the energy for heating the filaments of vacuum tubes and supply whatever other operating potentials are required. No revertive call key is provided since the transmission of a revertive call signal of carrier frequency F3 is automatically effected.

*Call from station 10 to a carrier telephone station*

Assume that a call is initiated at station 10, that the line 11 is connected py a line finder LF1 to a selector S1, that the selector S1 is selectively controlled by dial impulses from station 10 to select a group of trunks and an idle trunk therein associated with a connector C1, and that the connector C1 is selectively controlled by dial impulses from station 10 to select the line 21. Assume further that the line 21 is idle when tested by the connector C1, that a ringing code is selected responsive to dial impulses from station 10, and that the selected ringing code is transmitted through the brushes of connector C1 over the conductors of line 21 through condenser 33, rectifier 34, and a back contact of relay 52 to the winding of relay 35. Relay 35 is thereby operatively energized during each ringing interval of the ringing code transmitted over line 21. The operation of relay 35 connects the positive pole of battery B2 to conductor 39 to energize the oscillator-modulator-amplifier 40, disconnects the lower pair of windings of hybrid coil 30 from the input conductors of modulator 40, and connects these conductors through condensers 36 to the conductors of line 21; whereby the ringing current incoming over line 21 modulates the carrier current transmitted through filter 41, conductors 43 and coupler 44 over the power line PL to each of the carrier telephone stations connected to the power line.

At each of the carrier telephone subscriber stations the ringing current modulated carrier of frequency F1 incoming over power line PL is transmitted through a coupler 69, conductors 70, and a normally closed contact of the springs controlled by receiver hook 83, through receiving band filter 71 to the input circuit of amplifier-demodulator 73. The output circuit of amplifier-demodulator 73 includes resistor 74 and the winding of relay 76; and relay 76 is operated responsive to carrier current incoming over the power line. A condenser 75, connected in parallel with the winding of relay 76, renders this relay somewhat slow in operating so as to tend to prevent its operation responsive to interfering currents such as static. The output conductor of modulator 73 is further connected through condenser 81 thence through the off-normal contacts of dial 86 and telephone receiver 84 in parallel with resistor 82. While the telephone handset is in normal position on hook 83, receiver 84 and resistor 82 are short-circuited at a back contact of the springs controlled by hook 83. The operation of relay 76 closes a circuit from the lower winding of transformer 66 through rectifier 67, conductor 68, resistor 80, front contact of relay 76, condenser 78, and through the windings of ringer 79 to ground at a back contact of the springs controlled by receiver hook 83. The windings of ringer 79 are thereby energized while condenser 78 is charging. Since the incoming carrier current of frequency F1 is modulated by the frequency of the ringing current transmitted over line 21 from the central office, relay 76 is alternately operated and released at the ringing current frequency (for instance 16 cycles per second) during each ringing interval of the ringing code. Each time relay 76 releases, condenser 78 discharges through resistor 77; and each time relay 76 reoperates, condenser 78 is charged through ringer 79. Thus the ringer 79 at each of the carrier telephone subscriber stations associated with power line PL is actuated in accordance with the ringing code of the particular station which is being called.

When the handset is removed from the hook 83 at the called station, the circuit through ringer 79 is opened, the short circuit across the receiver 84 is opened, and the positive potential supply conductor 68 is connected to the winding of relay 93 and to the oscillator-modulator-amplifier 88, operating relay 93 and energizing the amplifier-modulator 88. Relay 93 is somewhat slow in operating to allow time for relay 90 to operate if relay 76 is operated at the time the handset is removed, as is the case at the calling station on a reverting call as hereinafter described. However, on the call being described, relay 76 is not operated at the called station when the handset is removed because at this time there is no carrier current of frequency F2 being transmitted over the power line, so that relay 90 is not operated; and the operation of relay 93 disconnects the winding of relay 90 from the armature of relay 76, thereby to prevent the operation of relay 90 on the call from station 10. Since relay 90 is normal, the oscillator crystal 92 is included in the oscillating circuit of oscillator-modulator 88 whereby carrier current of frequency F2 is generated and transmitted through filter 89, a front contact of relay 93, conductors 70, and coupler 69, over power line PL to each of the other carrier stations and to the carrier terminal equipment CT. The carrier current of frequency F2 does not reach the demodulator at the called station since relay 93 is operated and relay 90 is not operated; and does not reach the demodulator 73 at each of the other carrier subscriber stations because, at each of these stations, the input circuit of filter 72 is open as long as the handset is in normal position on hook 83. But at the carrier terminal equipment CT, the carrier current of frequency F2 passes through coupler 44, conductors 43 and receiving band filter 49 to the input circuit of amplifier-demodulator 50, causing the operative energization of the winding of relay 51. The operation of relay 51 closes a circuit for operating slow-to-release relay 52 and closes a bridge consisting of the left middle pair of windings of hybrid coil 30, across line 21 to trip the ringing in the connector C1. The opening of the ringing circuit and closing of the talking connection through connector C1 is effected in usual and well-known manner. The operation of relay 52 opens the circuit connection between the winding of relay 35 and line 21, and connects the positive pole of battery B2 to the amplifier-demodulator 60 and to the oscillator-modulator-amplifier 40. The energization of the amplifier-demodulator 60 performs no useful function on this call, but the energization of oscillator-modulator-amplifier 40 effects the transmission of carrier current of frequency F1 through filter 41 over the power line PL to each of the carrier stations, causing the energization of relay 76 at each of these stations. The voice currents incoming over line 21 from the calling station 10 are transmitted through hybrid coil 30 to the input circuit of modulator 40 to modulate the carrier current of frequency F1 transmitted over the power line to the carrier stations. At the called station, the voice current output of amplifier-demodulator 73 is transmitted through the receiver 84, but at the other carrier stations, the receiver is short-circuited at a contact of the receiver-hook springs. The transmitter 85 of the handset of the called station generates voice currents which are transmitted through coil 87 to the input circuit of modulator 88, to modulate the carrier current of frequency F2 which is being transmitted over the power line. The voice modulated carrier current of frequency F2 passes through filter 49 to demodulator 50; and the voice currents are transmitted through hybrid coil 30 over line 21 through the connector, selector and line-finder switches, over line 11 to the calling station 10. Two-way conversation now takes place over the established connection including the power line PL between the calling and called station.

When the handset is replaced on hook 83 of the called station, receiver 84 is short-circuited, relay 93 is released, and the oscillator-modulator-amplifier 88 is deenergized, terminating the transmission of carrier current of frequency F2 over the power line and thereby causing the successive release of relay 51 and 52 of the carrier terminal equipment CT. The release of relay 51 opens the bridge across line 21 thereby releasing the answering supervisory relay (not shown) in the connector C1. The release of the relay 52 disconnects battery B2 from oscillator-modulator-amplifier 40 to terminate the transmission of the carrier current of frequency F1 over the power line, thereby releasing relay 76 at each of the carrier stations. When the subscriber at the calling station 10 releases the connection, the connector C1, selector S1 and line finder LF1 are restored to normal in usual and well-known manner.

*Call from carrier telephone station*

Assume next that the handset is removed from hook 83 at one of the carrier telephone stations connected to power line PL to initiate a call. Relay 93 is thereby operated, relay 90 remains normal, and the oscillator-modulator-amplifier 88 is energized to transmit carrier current of frequency F2 over power line PL causing the successive operation of relays 51 and 52 of carrier terminal equipment CT. At each of the other carrier subscriber stations, the carrier current of frequency F2 transmitted over line PL from the calling carrier station is ineffective to operate relay 76 because the input conductors 70 are normally connected across the input conductors of filter 71 and are not normally connected across the input conductors of filter 72. The operation of relay 51 of carrier equipment CT closes the bridge across line 21 whereby the line relay (not shown) of line circuit 22 is operated to start an idle line finder such as LF2 to connect with the calling line; and line 21 is thus connected through the brushes of line finder LF2 to the associated selector S2. The operation of relay 52 opens the circuit connection between relay 35 and line 21 and connects battery B2 to oscillator-modulator-amplifier 40 and to amplifier-demodulator 60. The energization of oscillator-modulator-amplifier 40 effects the transmission of carrier current of frequency F1 over power line PL. Dial tone is transmitted from selector S2 over line 21 through hybrid coil 30 to the input of modulator 40 to modulate the carrier current of frequency F1 being transmitted over the power line to the carrier telephone station. The carrier current of frequency F1 effects the operation of relay 76 at each of the carrier stations; and, at the calling carrier station, the dial tone is transmitted through the receiver 84 to indicate that the dialing of the number of the telephone station with which connection is desired may be started. The calling party thereupon dials the directory number of the called station. When the dial is moved off-normal, the receiver 84 is disconnected from amplifier-demodulator 73 and, as the dial returns to normal, the impulse contacts of the dial modulate the carrier current of frequency F2 being transmitted from the oscillator-modulator-amplifier 88. Each dial impulse thus transmitted from the calling station over the power line causes the release and reoperation of relay 51. Each release and reoperation of relay 51 responsive to dial impulses, opens and closes the bridge across line 21 thereby repeating the dial impulses to selectively control the operation of selector S2 and a connector C2 to extend the connection to the called line and to select the ringing code required for signaling the called station. Since relay 52 is slow to release, it remains operated during the response of relay 51 to dial impulses.

Assume first that the called station is not one of the carrier stations connected to the power line PL. When the call is answered, the connector C2 opens the ringing circuit and closes the talking circuit in usual and well-known manner. Talking currents are transmitted through hybrid coil 30 and over the power line in both directions. The connection is under the control of the calling carrier telephone station; and, when the handset of this station is restored to normal condition on the hook 83, relay 93 is released and the amplifier-modulator 88 is deenergized, terminating the transmission of carrier current of frequency F2 and thereby causing the successive release of relays 51 and 52 of the carrier terminal equipment CT. The release of relay 51 opens the bridge across line 21 and the release of relay 52 deenergizes the oscillator-modulator-amplifier 40. The opening of the bridge across line 21 causes the release of the line relay (not shown) of the connector C2 and return of the selector S2 and line finder LF2 to normal in usual manner. The connector C2 is also restored to normal in usual manner as soon as both the calling and called stations have released the connection.

Assume next that the call initiated at a carrier telephone subscriber station as above described is a call to another subscriber station connected to the power line PL. In such a case, the connector C2 finds the called line 21 busy when it makes the busy test; and a busy tone is thereupon transmitted from the connector, through selector S2, and line finder LF2, over line 21, through hybrid coil 30, modulator-amplifier 40, filter 41, power line PL, filter 71, amplifier-demodulator 73, and condenser 81, to telephone receiver 84 at the calling station. The connector C2 is arranged to make a reverting call test, and, if the call is a reverting call, the line finder LF2 and selector S2 are restored to normal when the calling subscriber hangs up; but the connector C2 remains connected to the line 21 to ring the called station. Reference may be had to the patent to H. Hovland 1,849,087, granted March 15, 1932, for disclosure of a connector arranged to make the aforementioned reverting call test. Upon hearing the busy tone transmitted from connector C2, the calling subscriber hangs the handset on the hook 83. Relay 93 releases and the oscillator-modulator-amplifier 88 is deenergized to terminate the transmission of carrier current of frequency F2 over the power line and thus release relay 51 of the carrier terminal equipment CT. The release of relay 51 opens the bridge across the conductors of line 21, the line finder LF2 and selector S2 are restored to normal, and the connector C2 is operated to close the ringing circuit and apply the ringing code of the called station to the conductors of line 21. The release of relay 51 also causes the release of relay 52; but the energization of the ringing relay 35, responsive to ringing current received over line 21, effects the energization of the oscillator-modulator-amplifier 40 to transmit ringing current modulated carrier current of frequency F1 over the power line PL. At each of the carrier telephone subscriber stations, the relay 76 responds to the ringing current and causes actuation of the ringer 79 according to the ringing code of the called station. When the called subscriber answers by removing the handset from hook 83, relay 93 is operated and the oscillator-modulator-amplifier 88 is energized to transmit carrier current over the power line. Since relay 76 is not operated at this time, because there is no carrier current of frequency F2 being transmitted over the power line, relay 90 does not operate, and with relay 90 normal, oscillator crystal 92 is connected in the oscillator circuit of oscillator-modulator 88 so that carrier current of frequency F2 is transmitted therefrom over power line PL. The transmission of carrier current of frequency F2 over the power line PL from the called station effects the reoperation of relays 51 and 52 of the carrier terminal equipment CT. The operation of relay 51 closes the bridge across the conductors of line 21 to trip ringing and to operate the answering supervisory relay (not shown) of the connector C2 in usual manner. The operation of relay 52 connects the positive pole of battery B2 to energize the oscillator-modulator-amplifier 40 and also to energize the amplifier-demodulator 60. The energization of the oscillator-modulator-amplifier 40 effects the transmission of carrier current of frequency F1 over the power line to energize relay 76 at each of the carrier telephone stations.

When the operation of the ringer at the calling carrier telephone station ceases due to answer of the call at the called station, the calling party removes the handset from receiver hook 83, thereby opening the connection between input conductors 70 and the input conductors of filter 71 and connecting input conductors 70 to the input conductors of filter 72. Since, at this time, carrier current of frequency F2 is being transmitted over power line PL from the called station, relay 76 is operated at the calling station and removal of the receiver closes a circuit through the winding of relay 90, which circuit includes the outer right back contact of relay 93, a normally open contact of the springs controlled by hook 83, front contact of relay 76, resistor 80, conductor 68, rectifier 67 and the lower winding of transformer 66. Relay 90 is thus operatively energized before the slow to operate relay 93 operates; and relay 90 locks independent of relay 93. The operation of relay 90 connects the oscillator crystal 91 in the oscillating circuit of oscillator-modulator 88 in place of the crystal 92 whereby carrier current of frequency F1, modulated by voice current from transmitter 85, is transmitted from the calling station. With both of relays 90 and 93 operated at the calling station, the input circuit of filter F2 is closed and the input circuit of filter 71 is open; so that voice modulated carrier current of frequency F2 incoming from the called station is transmitted to the receiver 84. The aforementioned operation of relay 90 also connects the positive potential supply conductor 68 to oscillator-amplifier 94, to effect the transmission of carrier current of frequency F3 through transmitting filter 95 over the power line, through receiving filter 59 to amplifier-demodulator 60 thereby to effect the operation of relay 61. The operation of relay 61 disconnects the positive pole of battery B2 from oscillator-modulator-amplifier 40 to terminate the transmission of carrier current of frequency F1 from the carrier terminal equipment CT during the conversation between the calling and called subscriber's station.

If the calling subscriber hangs up first, relay 93 at this station releases and oscillator-modulator-amplifier 88 and oscillator-amplifier 94 are deenergized, whereby the transmission of carrier current of frequencies F1 and F3 from the calling station is terminated causing the release of relay 61 of the carrier terminal equipment CT and the release of relay 76 at each of the carrier stations not involved in the call described. The release of relay 61 connects battery B2 to oscillator-modulator-amplifier 40 whereby carrier current of frequency F1 is now transmitted from the carrier terminal equipment CT over the power line causing the reoperation of relay 76 at each of the carrier stations. Relay 51 is held operated by the carrier current of frequency F2 being transmitted over the power line from the called subscriber station. When the called subscriber disconnects, the oscillator-modulator-amplifier 88 thereat is deenergized terminating the transmission of carrier current of frequency F2 over the power line, releasing relays 51 and 52 of the carrier terminal equipment CT. The release of relay 51 opens the bridge across the conductors of line 21 thereby causing the release of the connector C2; and the release of relay 52 again connects the winding of relay 35 across line 21 for response to ringing current on a succeeding call.

If the called subscriber hangs up first, the transmission of carrier current of frequency F2 therefrom is terminated causing the release of relay 51 of the carrier terminal equipment CT and causing the release of relays 76 and 90 at the calling subscriber's station. The release of relay 90 at the calling station effects the deenergization of oscillator-amplifier 94 and reconnects the oscillating crystal 92 in the oscillating circuit of oscillator-modulator 88 in place of the crystal 91, whereby the transmission of carrier current of frequency F1 is terminated and the transmission of carrier current of frequency F2 is initiated at the calling subscriber's station. Relay 51 of the carrier terminal equipment CT is thus reoperated before the slow-to-release relay 52 has released so as to hold the central office connection until both of the subscribers have disconnected. When the calling subscriber hangs up, relay 93 releases and the oscillator-modulator-amplifier 88 is deenergized at this station.

If the called subscriber fails to answer on a reverting call, the ringer at each of the carrier stations is actuated by the ringing current until the receiver is removed from the switchhook at some one of the stations. When the receiver is replaced at this subscriber station, the carrier terminal equipment CT is restored to normal as well as the carrier equipment at the answering station.

What is claimed is:

1. In a telephone system comprising subscriber lines and switching means for connecting calling and called lines, a power transmission line, a plurality of telephone subscriber stations connected to said power line, and means comprising carrier terminal equipment connecting said power line to one of said subscriber lines, each of said stations comprising carrier current transmitting and receiving means for transmitting and receiving over the power line voice and signal modulated carrier currents of either one of two frequencies and means for transmitting at the same time that carrier current of a first one of said two frequencies is being transmitted a particular signal consisting of carrier current of a third frequency, said carrier terminal equipment comprising carrier current transmitting means for transmitting over said power line to any of said stations carrier current of said first one of said two frequencies and for modulating said carrier current with voice and signal currents incoming over said one subscriber line, carrier receiving means for receiving over said power line from any of said stations voice and signal modulated carrier current of the other of said frequencies and for transmitting said voice and signal currents over said one telephone line, and means controlled by the carrier receiving means responsive to said particular signal for preventing the transmission of carrier current over the power line from said carrier terminal equipment.

2. In a telephone system, a telephone line, a power line, a carrier terminal station interconnecting said lines, a plurality of telephone subscriber stations connected to said power line, each of said subscriber stations comprising a first carrier current transmitter arranged to transmit carrier current of either one of two frequencies and a carrier current receiver arranged to receive carrier current of the other of the two frequencies, a second carrier current transmitter at each subscriber station arranged to transmit over said power line to said carrier terminal station a signal consisting of carrier current of a third frequency, means at said carrier terminal station for transmitting over the power line carrier current of a particular one of said two frequencies, and means at said carrier terminal station effective responsive to said signal to prevent the transmission of carrier current of said one frequency over the power line from the carrier transmitting means at said carrier terminal station.

3. In a telephone system, a telephone line, a power line, a carrier terminal station interconnecting said lines, a plurality of telephone subscriber stations connected to said power line, each of said subscriber stations comprising carrier transmitting means arranged to transmit carrier current of either one of two frequencies and carrier receiving means arranged to receive carrier current of the other of the two frequencies, means at each subscriber station for interchanging the transmitting and receiving carrier frequencies responsive to energization of the receiver by carrier current of one of said two frequencies, means at each subscriber station for transmitting over said power line to said carrier terminal station a signal consisting of carrier current of a third frequency simultaneously with the transmission of carrier current of the other of said two frequencies, carrier transmitting means at said carrier terminal station for transmitting over the power line carrier current of said other of said two frequencies, carrier receiving means at said carrier terminal station and means controlled by said carrier receiving means responsive to said signal for preventing the transmission of carrier current of said other frequency from said carrier terminal station.

4. In a telephone system, a telephone line, a power line, a carrier terminal station interconnecting said lines, a plurality of telephone subscriber stations connected to said power line, said carrier terminal station comprising means for transmitting carrier current of a first frequency over said power line and for modulating said carrier current by voice and signal currents incoming over said telephone line, means for receiving carrier currents of a second frequency incoming over said power line from any of said subscriber stations and for transmitting over said telephone line voice and signal currents by which said carrier current is modulated, means responsive to carrier current of a third frequency incoming over the power line from any of said subscriber stations for preventing the transmission of carrier current over the power line from said carrier terminal station, means at each of said subscriber stations for receiving carrier current of either of said first and second frequencies and for transmitting carrier current of the other of said first and second frequencies, means at each of said subscriber stations for modulating said transmitted carrier current with voice or signal currents, and means at each of said subscriber stations for transmitting a signal consisting of current of said third frequency simultaneously with the transmission of carrier current of said first frequency.

5. In a telephone system, a telephone line, a power line, a carrier terminal station interconnecting said lines, a plurality of telephone subscriber stations connected to said power line, said carrier terminal station comprising means for transmitting carrier current of a first frequency over said power line and for modulating said carrier current by voice and signal current incoming over said telephone line, means for receiving carrier current of a second frequency incoming over said power line from any of said subscriber stations and for transmitting over said telephone line voice and signal currents by which said carrier current is modulated, and means controlled by said carrier current receiving means responsive to carrier current of a third frequency for preventing the transmission of carrier current of said first frequency over the power line from the carrier transmitting means of said carrier terminal station, means at each of said subscriber stations for receiving carrier currents of either of said first and second frequencies and for transmitting carrier current of the other of said first and second frequencies, means at each of said subscriber stations for modulating the transmitted carrier currents with voice or signal currents, and means at each of said subscriber stations rendered effective in response to carrier current of said second frequency for transmitting a signal consisting of current of said third frequency.

6. In a telephone system, a telephone line, a power line, a carrier terminal station interconnecting said lines, a plurality of telephone subscriber stations connected to said power line, each of said subscriber stations comprising carrier transmitting means arranged to transmit voice frequency modulated carrier current of either one of two frequencies and carrier receiving means arranged to receive voice frequency modulated carrier current of the other of the two frequencies, means at each subscriber station for transmitting over said power line to said carrier terminal station a signal consisting of carrier current of a third frequency simultaneously with the transmission of carrier current of a particular one of said two frequencies, means at said carrier terminal station for transmitting over the power line carrier current of a particular one of said two frequencies, and means at said carrier terminal station effective responsive to said signal to prevent the transmission of carrier current of said one frequency over the power line from the carrier transmitting means at said carrier terminal station.

7. In a telephone system comprising a telephone line, a power line, a carrier terminal station interconnecting said lines, and a plurality of telephone subscriber stations connected to said power line, each subscriber station comprising a telephone receiver and a receiver hook on which the receiver rests when not in use, means at said terminal station for transmitting carrier current of a first frequency over said power line and for modulating said carrier current by voice and signal currents incoming over said telephone line, a first carrier current receiver at said terminal station tuned to receive voice modulated carrier current of a second frequency incoming over said power line and to transmit over said telephone line the voice frequency components of said incoming carrier currents, means responsive to signal current incoming over said telephone line and to carrier current of said second frequency incoming over said power line for energizing said means for transmitting carrier current of said first frequency, a second carrier current receiver at said terminal station tuned to receive carrier current of a third frequency incoming over said power line, means responsive to carrier current of said third frequency incoming to said second carrier current receiver for deenergizing said means for transmitting carrier current of said first frequency, a carrier current transmitter at each of said subscriber stations for transmitting carrier current of said second frequency on calls incoming from or extended over said telephone line and for transmitting carrier current of said first frequency on calls to another of said subscriber stations, a carrier current receiver at each of said subscriber stations normally tuned to receive carrier current of said first frequency, means at each of said subscriber stations responsive to removal of the receiver from the receiver hook for tuning said carrier current receiver to receive carrier current of said second frequency, a second carrier current transmitter at each of said subscriber stations for transmitting carrier current of a third frequency over said power line, and means for energizing said second carrier transmitter responsive to carrier current of said second frequency incoming over the power line at the time the receiver is removed from the receiver hook.

JOHN M. BARSTOW.
ALBERT G. LANG.

REFERENCES CITED

The following references are of record in the file of this patent:

UNITED STATES PATENTS

| Number | Name | Date |
|---|---|---|
| 1,773,613 | Clark | Aug. 19, 1930 |
| 2,289,048 | Sandalls, Jr. | July 7, 1942 |
| 2,294,905 | Honaman | Sept. 8, 1942 |
| 2,383,908 | Bowers | Aug. 28, 1945 |
| 2,387,146 | Haberl | Oct. 16, 1945 |
| 2,430,471 | Lang | Nov. 11, 1947 |